M. C. WILLIAMS.
SIFTER.
APPLICATION FILED JULY 9, 1908.
934,492. Patented Sept. 21, 1909.
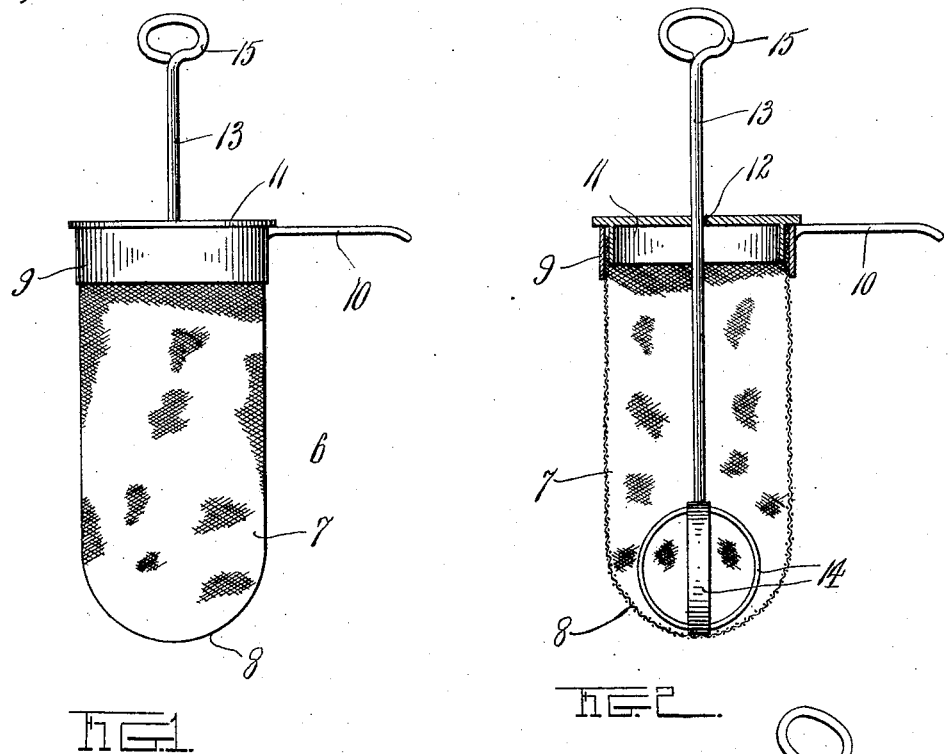
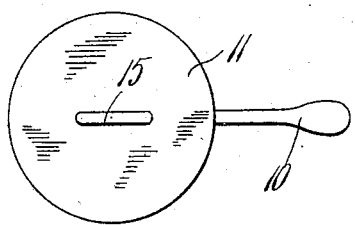
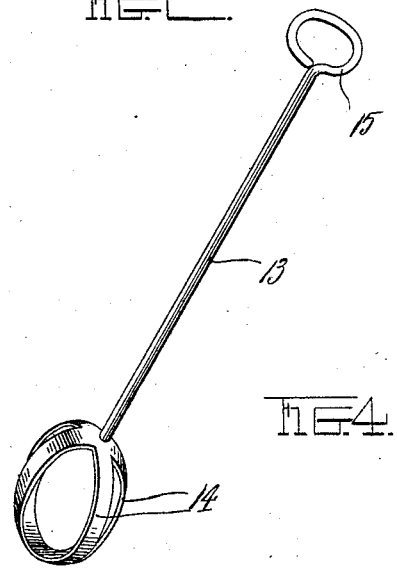
Witnesses
J. H. Crawford
O. Parker
Inventor
Mary C. Williams,
By
Attorneys

UNITED STATES PATENT OFFICE.

MARY C. WILLIAMS, OF BEDFORD, KENTUCKY, ASSIGNOR OF ONE-HALF TO EDMONIA FARLEY, OF BETHLEHEM, INDIANA.

SIFTER.

934,492.

Specification of Letters Patent. Patented Sept. 21, 1909.

Application filed July 9, 1908. Serial No. 442,717.

*To all whom it may concern:*

Be it known that I, MARY C. WILLIAMS, a citizen of the United States, residing at Bedford, in the county of Trimble, State of Kentucky, have invented certain new and useful Improvements in Sifters; and I do hereby declare the following to be a full, clear, and exact description of the invention, such as will enable others skilled in the art to which it appertains to make and use the same.

The invention relates to a sifter and more particularly to the class of flour sifters.

The primary object of the invention is the provision of a sifter in which material may be thoroughly agitated and sifted so as to properly clean said material prior to the use thereof.

Another object of the invention is the provision of a sifter constructed with few parts and is simple in construction, efficient in operation, and inexpensive in the manufacture.

With these and other objects in view the invention for example consists in the construction, combination and arrangement of parts as will be hereinafter more fully described and as illustrated in the accompanying drawings which disclose the preferred form of embodiment of the invention. However, it is to be understood that changes, variations and modifications may be made such as come properly within the scope of the claim hereunto appended without departing from the spirit of the invention.

In the drawings: Figure 1 is a side view of the invention. Fig. 2 is a longitudinal sectional view. Fig. 3 is a top plan view. Fig. 4 is a detailed perspective view of the shaft carrying the radially disposed blades or agitators.

Similar reference characters indicate corresponding parts throughout the several views in the drawings.

In the drawings, the numeral 6 designates generally the sifter which comprises an elongated wire mesh body 7 preferably of cylindrical shape and having its bottom or lower portion 8 of hemispherical form. The body 7 at its mouth portion is connected to an annulus forming a reinforcing band or rim 9 having formed integral therewith a projecting handle 10 in the plane with the edge and this handle being for the purpose of holding the sifter when in use.

Fitted into the mouth portion of the body 7 is a removable cover or lid 11 having a central opening 12 in which is slidably mounted a shaft or rod 13 having at its lower end rings 14 crossing each other so that material contained within the wire mesh body can be disturbed or agitated by the rings 14 upon the upward and downward movement of the shaft or rod 13 which latter is actuated by an operator gripping a handle 15 on the upper end thereof, whereby the said material will be screened through the body to separate foreign matter from the same. It is obvious that the body 7 is entirely formed of wire mesh so as to present and afford a large or increased screening surface to the sifter.

It is apparent that this sifter can be used for other purposes such as a strainer in separating foreign matter from fluid or the said sifter may be utilized for receiving other ingredients to be sifted or strained.

What is claimed is—

A sifter of the class described comprising an annulus having a handle integral therewith and projecting therefrom in a plane with the upper edge of the same, a foraminated elongated body having an open end secured to the inner face of the annulus and a semi-spherical shaped bottom, the said body being foraminated throughout its entire length, a centrally perforated flat cover having a depending engaging flange to fit into the annulus, and a rod freely slidable in said perforation and having rings crossing each other secured thereto at one end and the opposite end terminating in a handle.

In testimony whereof, I affix my signature, in presence of two witnesses.

MARY C. WILLIAMS.

Witnesses:
ELIZABETH HOSLEY,
EUGENE MASLEY.